Nov. 9, 1948.  W. H. MARTIN  2,453,331
CONNECTION FOR ENAMELED TANKS
Filed Sept. 2, 1943

INVENTOR.
WILLIAM H. MARTIN
BY
Oberlin, Limbach & Day
ATTORNEYS

Patented Nov. 9, 1948

2,453,331

UNITED STATES PATENT OFFICE 2,453,331

CONNECTION FOR ENAMELED TANKS

William H. Martin, Lakewood, Ohio, assignor, by mesne assignments, to Republic Industries, Inc., New York, N. Y., a corporation of Delaware Application September 2, 1943, Serial No. 500,953

5 Claims. (Cl. 285—49)

This invention relates as indicated to connections for enameled tanks, and more specifically to a pipe connection for tanks such as hot water storage tanks which are provided with an internal corrosion resistant coating.

It is a principal object of this invention to provide a construction of the character described characterized in that there are no parts of the tank structure itself exposed to the contents of the tank which are not protected by a corrosion resistant coating or which are not formed of a corrosion resistant material.

It is a further and more particular object of my invention to provide a tank structure in which the pipe connection is so formed that the danger of injury to the tank and its corrosion resistant lining during installation of the pipe connection is reduced to a very minimum. Other and more particular objects of my invention will appear as the description proceeds.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

Figure 1:
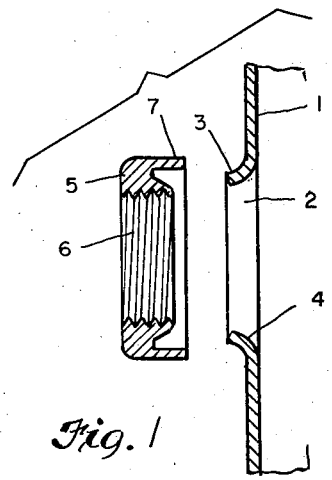
Figure 2:
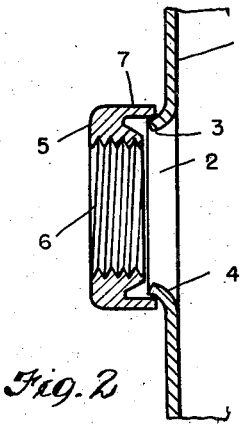
Figure 3:
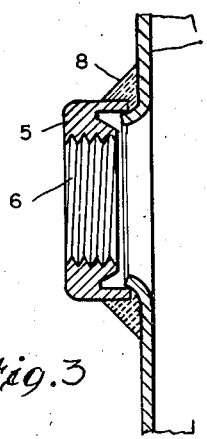
Figure 4:
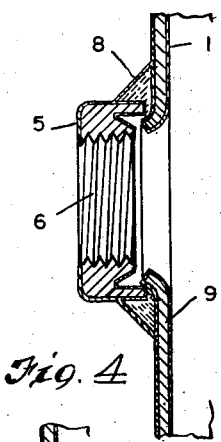
Figure 5:
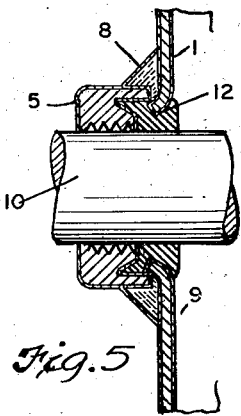
Figure 6:
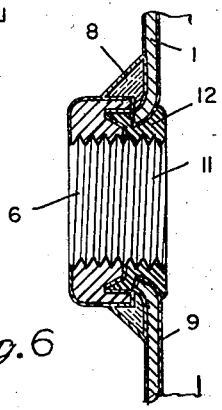

In said annexed drawing:

Fig. 1 is a transverse sectional view of a portion of the tank before assembly, showing in conjunction therewith one of the elements which comprise the element connection of my invention; Fig. 2 shows the parts illustrated in Fig. 1 with such parts joined however by tack welding as one of the first steps in the operation of producing my improved construction; Fig. 3 is a view similar to Fig. 2 after however the parts have been further and more securely joined by means of a fillet weld extending around the connection; Fig. 4 is a view showing a further step in the manufacture of my construction in that in this figure the assembly is now provided with a corrosion resistant coating; Fig. 5 shows the further step of filling the recess on the inner face of the assembly with a thermo-plastic corrosion resistant material; and Fig. 6 shows the completed assembly with the pipe threads extending therethrough.

Referring now more particularly to the drawing and more especially to Fig. 1, the parts here illustrated comprise a portion 1 of the tank wall, the same being provided with an opening 2 surrounded by an outwardly extending flange 3. The flange is so formed that the juncture thereof with the body of the tank as generally indicated at 4 is a smooth curve so as to facilitate the application of a continuous corrosion resistant coating thereto formed of material such as porcelain enamel.

The element 5 is an annulus centrally provided with preformed pipe threads 6 and having an axially extending skirt 7. The inside diameter of the skirt is such that when the parts are brought together in the manner illustrated in Fig. 2, the skirt will embrace the wall of the tank about the flange 3. As the first step in the process of producing my improved construction, the parts are brought together in the manner illustrated in Fig. 2 and then by engaging the opposite parts with the opposite poles or electrodes of a resistance welding machine, the skirt 7 is resistance welded to the wall 1 or more accurately the outer surface of the flange 3 adjacent the outer face of the wall. This resistance welding operation being performed in a conventional resistance welding machine holds the two parts in pre-determined relation during the welding operation and after such resistance weld is performed, the annulus 5 is then held in proper predetermined relation with respect to the wall 1.

After the parts are thus preliminarily joined they are then further united by means of a fillet weld 8 as illustrated in Fig. 3. This fillet weld may be deposited either by means of an oxy-acetylene flame or by means of an electric arc. It will be observed that the fillet weld is of substantial dimensions, thus providing a connection of the annulus 5 to a substantial portion of the wall 1 of the tank so that when a pipe is screwed into the connection there will be no flexure of the wall 1 which would result in a cracking or chipping of any corrosion resistant coating such as porcelain enamel which may be applied thereto.

After the parts are thus fillet welded, as illustrated in Fig. 3, the entire assembly, or at least the inner surface thereof, is provided with a corrosion resistant coating 9 formed as previously indicated of porcelain enamel or other suitable material. This enameling operation may be performed in any conventional way. However, care should be observed in performing this operation to mask or otherwise shield the threads 6 so that none of the corrosion resistant coating will be deposited thereon. It is essential however that the corrosion resistant coating extend over the curve 4 and into the annular recess provided by the annulus 5 and which recess opens to the inner face of the wall.

After this corrosion resistant coating has been applied, there is then inserted in the assembly a guard block 10 which snugly fits the threads 6 and which block may be formed of some suitable material such as wood or metal. After the guard block 10 has been inserted, the annular opening previously referred to is filled by means of a suitable thermo-plastic corrosion resistant material such as lead or other soft metal alloys. This operation is performed by having the parts in a horizontal position with the opening facing upwardly and then pouring into such opening the lead or other suitable material in a fluid state, such filling proceeding to a point where the entire recess is completely filled.

After the operation of filling the recess as just described, the block 10 is removed and by means of a suitable tap the threads 11 are formed in the thermo-plastic material 12. After the parts are thus formed, a pipe may be screwed into the threads 6 and 11 and the assembly as thus provided has no parts exposed to the contents of the tank excepting such as either consist of a corrosive resistant material or are coated by a corrosion resistant material. The shape of the annular recess which is filled with the material 12 is such that when the pipe is screwed into the opening the material 12 will not be displaced axially. The roughness of the surface and the bond which occurs when the highly heated thermo-plastic material solidifies in contact with the walls of the annular opening prevents the material 12 from rotating as the pipe is screwed into the connection.

From the proportion of the parts as illustrated in the drawing, and the drawing has been reproduced to scale, it will be observed that the diameter of the connection including the fillet weld 8 is equal to at least twice and preferably three times the distance by which the annulus projects from the face of the wall 1. This is an important factor for the reasons which may be explained as follows: When a pipe is screwed into the opening it is common practice for the workman to apply his wrench to the pipe adjacent the opening. As force is applied to the handle of the wrench, a bending moment is set up in the wall of the tank. This bending moment is directly proportional to the length of the lever arm, such lever arm being the distance from the surface of the wall to the point of application of the load. By reducing the length of such lever arm to a very minimum, the bending moment to which the tank wall is subjected is correspondingly reduced. It has been found that when the diameter of the connection, i. e. diameter of the reinforced area is at least twice, and preferably three times, the distance by which the threaded connection extends from the face of the tank, the construction will be sufficiently rigid so that for all normal forces applied during the installation of the pipe, the tank will not be flexed so as to injure the relatively inflexible corrosion resistant coating applied to the inner surface thereof.

It will be recognized by those familiar with the art of porcelain enameling that the surface of the anular recess is quite difficult to coat with an enamel which is of uniform thickness. By filling such recess with a thermo-plastic corrosion resistant material, this area is completely protected. However, in order to somewhat more fully insure that there will be no failure of the corrosion resistant surface in this area, the enameled surface of the recess may be coated with a corrosion resistant paint before the thermo-plastic material 12 is poured. A paint suitable for this purpose comprises a suspension of flaked metallic lead in a suitable carrier vehicle such as a varnish and it will be found that either a phenolic varnish or a vinylite varnish or one having a chlorinated rubber base will be particularly suitable for use. The metallic lead paint insures the filling of all small pores and thus removes the very last possibility of there being any portions of the inner face of the assembly which are not fully corrosion resistant. In general however, the application of the material 12 when the same is lead or a suitable soft metal alloy is sufficient to provide the necessary protection.

The annulus 5 is preferably of steel, although other metals such as corrosion resistant alloys may be used.

Other modes of applying the principle of the invention may be employed, change being made as regards the details described, provided the features stated in any of the following claims, or the equivalent of such, be employed.

I therefore particularly point out and distinctly claim as my invention:

1. In a tank having a corrosion resistant lining, a pipe connection formed by providing an opening in a wall of the tank, an annulus having an axially extending skirt engaging said wall about said opening and providing an annular keying recess having a cross-sectional dimension greater than the width of its inlet and opening to the inner face of the wall, an external fillet weld joining said annulus and wall, a corrosion resistant coating over the inner surface of the assembly, and a body of thermo-plastic corrosion-resistant material filling said recess.

2. In a tank having a corrosion resistant lining, a pipe connection formed by providing an opening in a wall of the tank, an annulus having an axially extending skirt engaging said wall about said opening and providing an annular recess opening to the inner face of the wall, an external fillet weld joining said annulus and wall, the overall diameter from outer edge to outer edge of said fillet weld being at least twice the distance by which said annulus extends from the outer face of the wall, a corrosion-resistant coating over the inner surface of the assembly, and a body of thermo-plastic corrosion-resistant material filling said recess.

3. In a tank having a corrosion resistant lining, a pipe connection formed by providing an opening in a wall of the tank, an annulus having an axially extending skirt engaging said wall about said opening and providing an annular keying recess having a cross-sectional dimension greater than the width of its inlet and opening to the inner face of the wall, an external fillet weld joining said annulus and wall, a corrosion resistant coating over the inner surface of the assembly, a body of thermo-plastic corrosion-resistant material filling said recess and a pipe thread comprising axially contiguous sections respectively formed on said annulus and on said filling material.

4. In a tank having a corrosion resistant lining, a pipe connection formed by providing an outwardly flanged opening in a wall of the tank, an annulus having an axially extending skirt engaging said wall about said flange and providing an annular keying recess having a cross-sectional dimension greater than the width of its inlet and opening to the inner face of the wall, an external fillet weld joining said annulus and wall, a corrosion resistant coating over the inner surface of the assembly, a body of thermo-plastic corrosion-resistant material filling said recess and a pipe thread comprising axially contiguous sections respectively formed on said annulus and on said filling material.

5. In a tank having a corrosion resistant lining, a pipe connection formed by providing an outwardly flanged opening in a wall of the tank, an annulus having an axially extending skirt engaging said wall about said flange and providing an annular recess opening to the inner face of the wall, an external fillet weld joining said annulus and wall, the overall diameter from outer edge to outer edge of said fillet weld being at least twice the distance by which said annulus extends from the outer face of the wall, a corrosion-resistant coating over the inner surface of the assembly, a body of thermo-plastic corrosion-resistant material filling said recess and a pipe thread comprising axially contiguous sections respectively formed on said annulus and on said filling material.

WILLIAM H. MARTIN.

REFERENCES CITED

The following references are of record in the file of this patent:

UNITED STATES PATENTS

| Number | Name | Date |
| --- | --- | --- |
| 139,734 | Puffer | June 10, 1873 |
| 1,556,451 | Mauck | Oct. 6, 1925 |
| 1,556,596 | Fey | Oct. 13, 1925 |
| 1,875,404 | Aiton | Sept. 6, 1932 |
| 2,005,087 | Kamack | June 18, 1935 |
| 2,179,476 | Andrus | Nov. 14, 1939 |
| 2,216,667 | Holzkamper | Oct. 1, 1940 |
| 2,220,893 | Dodson | Nov. 12, 1940 |
| 2,360,359 | Myers | Oct. 17, 1944 |